United States Patent
Lanoiselee et al.

(10) Patent No.: US 10,999,115 B2
(45) Date of Patent: May 4, 2021

(54) METHOD FOR GENERATING A MULTICARRIER SIGNAL, DEMODULATION METHOD, COMPUTER PROGRAM PRODUCT AND CORRESPONDING DEVICES

(71) Applicant: ORANGE, Paris (FR)

(72) Inventors: Marc Lanoiselee, Chatillon (FR); Bruno Jahan, Chatillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/771,912

(22) PCT Filed: Dec. 13, 2018

(86) PCT No.: PCT/FR2018/053265
§ 371 (c)(1),
(2) Date: Jun. 11, 2020

(87) PCT Pub. No.: WO2019/115956
PCT Pub. Date: Jun. 20, 2019

(65) Prior Publication Data
US 2020/0403834 A1 Dec. 24, 2020

(30) Foreign Application Priority Data
Dec. 14, 2017 (FR) ...................... 1762116

(51) Int. Cl.
*H04L 27/26* (2006.01)
*H04L 5/00* (2006.01)
(52) U.S. Cl.
CPC ............ *H04L 27/264* (2013.01); *H04L 5/001* (2013.01); *H04L 27/2649* (2013.01)
(58) Field of Classification Search
CPC .... H04L 27/264; H04L 27/2649; H04L 5/001
See application file for complete search history.

(56) References Cited

U.S. PATENT DOCUMENTS 7,099,396 B1 * 8/2006 Combelles .......... H04L 27/2698
370/210
8,743,978 B2 6/2014 Lele et al.
(Continued)

FOREIGN PATENT DOCUMENTS

FR 2928233 A1 9/2009

OTHER PUBLICATIONS

English translation of the Written Opinion of the International Searching Authority dated Jun. 16, 2020 for corresponding International Application No. PCT/FR2018/053265, filed Dec. 13, 2018.
(Continued)

*Primary Examiner* — Dac V Ha
(74) *Attorney, Agent, or Firm* — David D. Brush; Westman, Champlin & Koehler, P.A.

(57) ABSTRACT

A method for generating a multicarrier signal formed by multicarrier symbols. the method includes: obtaining N first modulating symbols and N second modulating symbols from a sequence of source symbols, the obtaining including, for at least one of the source symbols indexed k, a sub-step of: linearly combining a real part and an imaginary part respectively, of the symbol indexed k with a real part and an imaginary part respectively, of one of the source symbols indexed k+/−R, with R being a non-zero integer, delivering at least one first and one second combined symbol respectively; performing a frequency-time transformation of the N first and N second modulating symbols respectively, delivering a first block and a second block of N carriers respectively; and generating the multicarrier symbol from the first and second blocks of N carriers.

17 Claims, 4 Drawing Sheets

(56) References Cited

U.S. PATENT DOCUMENTS

| | | | |
|---|---|---|---|
| 10,237,110 B2* | 3/2019 | Kim | H04L 27/2663 |
| 2014/0286384 A1* | 9/2014 | Mestre Pons | H04L 27/2647 375/232 |
| 2018/0254937 A1* | 9/2018 | Dore | H04L 27/2697 |
| 2019/0134203 A1* | 5/2019 | Tamarkin | A61K 31/593 |
| 2020/0322196 A1* | 10/2020 | Nadal | H04L 27/2698 |

OTHER PUBLICATIONS

International Search Report dated Jan. 29, 2019 for corresponding International Application No. PCT/FR2018/053265, filed Dec. 13, 2018.
Written Opinion of the International Searching Authority dated Jan. 29, 2019 for corresponding International Application No. PCT/FR2018/053265, filed Dec. 13, 2018.
Hao Lin, "Flexible Configured OFDM for 5G Air Interface", IEEE Access, vol. 3, Jan. 1, 2015 (Jan. 1, 2015), pp. 1861-1870, XP055276445.
Behrouz Farhang-Boroujeny: "OFDM Versus Filter Bank Multicarrier", IEEE Signal Processing Magazine, IEEE Service Center, Piscataway, NJ, US, vol. 28, No. 3, May 1, 2011 (May 1, 2011), pp. 92-112, XP011354670.

* cited by examiner

METHOD FOR GENERATING A MULTICARRIER SIGNAL, DEMODULATION METHOD, COMPUTER PROGRAM PRODUCT AND CORRESPONDING DEVICES

CROSS-REFERENCE TO RELATED APPLICATIONS

This Application is a Section 371 National Stage Application of International Application No. PCT/FR2018/053265, filed Dec. 13, 2018, which is incorporated by reference in its entirety and published as WO 2019/115956 A1 on Jun. 20, 2019, not in English.

1 TECHNICAL FIELD

The field of the invention is that of the transmission of digital data via a multicarrier signal.

More specifically, the invention relates to a technique for generating a multicarrier signal having improved spectral performance, for example as compared with OFDM (orthogonal frequency-division multiplexing) type multicarrier signals, as well as to a technique for the demodulation of such a signal.

Such signals are widely used in the transmission of digital data by cable or by radio on RF carrier frequency. Thus, the invention has many applications, especially but not exclusively in the fields of local wireless networks (WiFi), 3GPP LTE (3rd Generation Partnership Project and Long Term Evolution) mobile cell radiotelephony or again ADSL (Asymmetric Digital Subscriber Line), but also in the field of broadcasting, as described for example in standards relating to Digital Audio Broadcasting (DAB), digital television broadcasting, especially DVB-T (Digital Video Broadcasting-Terrestrial) or DVB-T2, or again cable broadcasting, especially DVB-C (Digital Video Broadcasting-Cable).

2 TECHNOLOGICAL BACKGROUND

In digital communications, OFDM modulation has become predominant for about the past twenty years as the reference modulation since its adoption in the different standards such as DAB, DVB-T/T2, ADSL, 3GPP LTE, etc.

The intrinsic qualities of this type of modulation, as compared with single-carrier modulations, in terms of spectral congestion, resistance to time-dispersal channels and simplicity of equalization operation with one coefficient per carrier (what is called the "zero forcing" method) have ensured its success in the above-mentioned standards.

The guard interval "A" which consists in adding a signal portion between two blocks of payload symbols is an important element of this modulation. Indeed, the guard interval enables the absorption of the echoes prompted by multiple reflections during radio transmissions. It can be used to carry out a first temporal synchronization, called a coarse synchronization, of the system and thus accurately place the FFT (Fast Fourier Transform) window to demodulate the signal.

However, there are limits that appear in OFDM modulation, especially in terms of spectral efficiency, in the face of ever-increasing bitrate requirements as well as in the face of increasingly complex scenarios that appear in the new standards.

Indeed, the time localization of multicarrier signals, also called OFDM blocks, defined by a rectangular window, the frequency response of which is a cardinal sine function, does not give a spectrum as confined as is required by the specifications of the new standards.

Alternative solutions have been proposed. In particular, OFDM/OQAM (Offset Quadrature Amplitude Modulation) modulations have been proposed. Such multicarrier modulations have spectral responses that are far better localized in frequency than in the case of OFDM.

However, OFDM/OQAM modulations do not enable the introduction of any guard interval. Now, even when the absence of a guard interval makes it possible to increase the spectral efficacy of the modulation, such an absence limits the capacities of the modulation to absorb the echoes present in highly time-dispersive channels.

Thus solutions for introducing a guard interval with the OFDM/OQAM modulations have been envisaged (for example the one disclosed in the patent application FR2928233 (A1)) but with a deterioration of the spectral quality, thus limiting these modulations to low time-dispersive channels.

There is thus a need for a multicarrier modulation having improved spectral efficacy as compared with OFDM modulations.

There is also a need for such a modulation that enables the insertion of a guard interval.

Finally, there is a need for the generation as well as the demodulation of a signal modulated according to such a modulation that is simple in terms of hardware implementation.

3 SUMMARY

One embodiment of the invention proposes a method for generating a multicarrier signal formed by multicarrier symbols. Such a method implements the following steps, for generating at least one of the multicarrier symbols:

obtaining N first modulating symbols and N second modulating symbols from a sequence of source symbols, the obtaining comprising, for at least one of the source symbols indexed k, a sub-step of:

linear combination of a real part, and an imaginary part respectively, of the source symbol indexed k with a real part, and an imaginary part respectively, of one of the source symbols indexed k+/−R, with R being a non-zero integer, the linear combination delivering at least one first combined symbol, and at least one second combined symbol respectively, at least one of the N first modulating symbols, and at least one of the N second modulating symbols respectively, being a function of the at least one first combined symbol, and the at least one second combined symbol respectively;

frequency-time transformation of the N first modulating symbols, delivering a first block of N carriers, each carrier of the first block being modulated by one of the first modulating symbols and of the N second modulating symbols, delivering a second block of N carriers, each carrier of the second block being modulated by one of the second modulating symbols; and generating the multicarrier symbol from the first and second blocks of N carriers.

Thus, the invention proposes a novel and inventive solution in order to enable the generation of a multicarrier signal having improved spectral efficiency as compared for example with an OFDM type signal.

To this end, the claimed method proposes to transform the source symbols into modulating symbols obtained by a linear combination of the real part and the imaginary part respectively of the symbols of the sequence of source symbols, with the real part and imaginary part respectively of the symbols of the same sequence but offset by a delay R. Such a linear combination performed in the frequency domain, i.e. before frequency-time transformation (e.g. before inverse Fourier transform), implements a sine windowing in the time domain. The generated signal is then apodized and its spectrum is improved.

Besides, the delay R defines the number of half-periods of the sine windowing functions that are present on the duration of the generated multicarrier symbol (for R equal to 1, we have one half-sine period, for R equal to 2, we have one sine period, for R equal to 4, we have two periods, etc.). The zeros of the sine windowing functions obtained weight the start and the end of the multicarrier symbol generated, thereby improving its spectrum.

According to one embodiment, the step for obtaining further comprises a sub-step of phase rotation applied to the at least one first combined symbol, and to the at least one second combined symbol respectively, delivering the at least one of the N first modulating symbols, and the at least one of the N second modulating symbols respectively.

Thus, the real and imaginary parts of the symbols transmitted are maintained in quadrature despite the different processing operations that are applied to them in order to generate the multicarrier signal. As a result, the transmitted signals can be easily estimated at reception.

According to one embodiment, the step of generation comprises a sub-step of synchronization of the first and second blocks of N carriers delivering first and second synchronized blocks. The multicarrier symbol is generated from first and second synchronized blocks.

Thus, the sine functions weighting the first and second synchronized blocks are kept in quadrature. As a result, the real and imaginary parts of the transmitted symbols can be easily differentiated and estimated at reception. Besides, the mean power of the multicarrier signal thus generated is not degraded by the considered sine windowing.

According to one embodiment, the step of synchronization comprises a temporal offset of the first block respectively of N carriers, and the second block of N carriers respectively, relative to the second block of N carriers, and first block of N carriers respectively, delivering the first and second synchronized blocks.

Thus, the synchronization of the first and second blocks of N carriers is implemented simply and efficiently.

According to one embodiment, the step of generation comprises a sub-step for summing the first and second synchronized blocks, delivering the multicarrier symbol.

According to one embodiment, the step of generation further comprises a step of insertion of a guard interval, by cyclical duplication of p*(N/R) samples of the first block of N carriers, and second block of N carriers respectively, with p being a non-zero integer and R being an integer sub-multiple of N, delivering first extended blocks of N carriers, and second extended blocks of N carriers respectively. The synchronization sub-step is applied to the first and second extended blocks to deliver the first and second synchronized blocks.

Thus, the duration of the guard interval is a multiple integer of the half-period of the sine windowing functions. As a result, the spectrum of the multicarrier signal obtained remains improved even when guard intervals are provided in the multicarrier symbols.

According to one embodiment, the linear combination comprises a summing or a subtraction between the real part, and the imaginary part respectively, of the source symbol indexed k and the real part, and imaginary part respectively, of the source symbol indexed k+/−R multiplied by a pure imaginary number.

Thus, the propagation of errors from estimated symbol to estimated symbol during the estimation of the source symbols at reception is reduced.

One embodiment of the invention proposes a method for demodulating a multicarrier signal formed by multicarrier symbols. Such a method comprises the following steps:
time-frequency transformation of a set of N input samples obtained from the multicarrier signal, delivering at least N modulating symbols; and
estimation of at least one source symbol from N first modulating symbols, and N second modulating symbols respectively, obtained from said at least N modulating symbols, the estimation comprising, for at least one of the N first modulating symbols indexed k, and N second modulating symbols indexed k respectively, a sub-step of:
linear combination of an imaginary part of the modulating symbol indexed k, with a real part of one of the N first modulating symbols indexed k+/−R, and N second modulating symbols indexed k+/−R respectively, with R being a non-zero integer, the linear combination delivering a real part, and an imaginary part respectively, of an estimate of the at least one source symbol.

Thus, the invention also relates to a method for demodulating a multicarrier signal having a spectral efficacy that is improved as compared for example with an OFDM type signal.

To this end, the claimed method proposes to implement an operation that is symmetrical with that of the linear combination described here above with relation to the method for generating a multicarrier signal. More particularly, the corresponding processing operations of linear combination of the real part, and imaginary part respectively, of the sequences of modulating symbols obtained at output of the time-frequency transformation step (e.g. after direct Fourier transform) with the real part, and the imaginary part respectively, of the modulating symbols of the same sequences but offset by a delay R enable the estimation of the source symbols transmitted.

According to one embodiment, the demodulation method furthermore comprises a step for obtaining a set of N first samples and a set of N second samples from at least N input samples of the multicarrier signal. The time-frequency transformation is applied on the one hand to the set of N first samples delivering the N first modulating symbols and on the other hand to the set of N second samples delivering the N second modulating symbols.

According to one embodiment, the step for obtaining comprises sub-steps of:
duplicating the at least N input samples of the multicarrier signal delivering a set of at least N first input samples and a set of at least N second input samples; and
synchronizing said sets of at least N first and at least N second input samples delivering a set of at least N first synchronized samples and a set of at least N second synchronized samples.

The set of N first and N second samples are obtained from said sets of at least N first and N second synchronized samples.

Thus, the time-frequency transformation implemented at reception is applied to the samples corresponding to the source symbols of the same multicarrier symbol despite the setting in quadrature of the sine weighting functions during the generation of the considered multicarrier symbol as described here above with reference to the method for generating a multicarrier signal.

According to one embodiment, the synchronization sub-step comprises a temporal offset of the set of at least N first input samples, and of the set of at least N second input samples respectively, in relation to the set of at least N second input samples, and the set of at least N first input samples respectively, delivering the set of at least N first and second synchronized samples.

Thus, the synchronization of the sets of at least N first and N second input samples is implemented simply and efficiently.

According to one embodiment, the at least N first synchronized samples, and the at least N second synchronized samples respectively, are N+p*(N/R) first synchronized samples, and N+p*(N/R) second synchronized samples respectively, with p being a natural integer and R being an integer sub-multiple of N. The step for obtaining comprises a sub-step for eliminating a guard interval by elimination of p*(N/R) samples among the N+p*(N/R) first synchronized samples, and among the N+p*(N/R) second synchronized samples respectively, delivering the set of N first samples, and the set of N second samples respectively.

According to one embodiment, the step of time-frequency transformation delivers the N first and N second modulating symbols. The demodulation method furthermore comprises a step of phase rotation applied to the N first modulating symbols, and N second modulating symbols respectively, delivering N first phase-shifted modulating symbols, and N second phase-shifted modulating symbols respectively. The sub-step of linear combination is applied to the N first phase-shifted modulating symbols, and N second phase-shifted modulating symbols respectively, to deliver the at least one source symbol.

Thus, the phase rotation applied during the generation of the multicarrier symbol as described here above with reference to the method for generating a multicarrier signal is cancelled so as to improve the estimation of the transmitted source symbols.

According to one embodiment, the method of demodulation further comprises:
 a step of phase rotation applied to the at least N modulating symbols delivering N phase-shifted modulating symbols; and
 a step of duplication of the N phase-shifted modulating symbols delivering N first phase-shifted modulating symbols, and N second phase-shifted modulating symbols respectively;
the sub-step of linear combination being applied to the N first phase-shifted modulating symbols, and to the N second phase-shifted modulating symbols respectively, to deliver the at least one source symbol.

Thus, the method of demodulation can be implemented in a simplified way in implementing only one time-frequency transformation block (for example a single direct Fourier transform). The time-shift effect related to the setting in quadrature of the sine weighting functions, obtained during the generation of the considered multicarrier symbol, is cancelled in this case by a complementary phase shift of the modulating symbols on the basis of which one of the two above-mentioned linear combinations is implemented.

The invention also relates to at least one computer program comprising program code instructions for the implementing of at least one method as described here above according to any one of its different embodiments, when it is executed by a computer.

Another embodiment of the invention proposes a corresponding device for generating a multicarrier signal.

Such a generating device is especially designed for implementing the method for generating a multicarrier signal according to the invention (according to any one of its different embodiments mentioned here above).

Thus, the characteristics and advantages of this device are the same as those of the method of generation described here above. They are therefore not described in more ample detail.

Another embodiment of the invention proposes a corresponding device for demodulating a multicarrier signal.

Such a demodulation device is especially designed for implementing the method for demodulating a multicarrier signal according to the invention (according to any one of the different embodiments described here above).

Thus, the characteristics and advantages of this device are the same as those of the method of demodulation described here above. They are therefore not described in more ample detail.

4 LIST OF FIGURES

Other features and advantages of the invention shall appear from the following description, given by way of an indicative and non-exhaustive example, and from the appended drawings of which.

5 DETAILED DESCRIPTION OF THE INVENTION

In all the figures of the present document, the identical elements and steps are designated by a same reference.

The general principle of the technique described consists in generating a multicarrier signal, in carrying out a differentiated processing of the real and imaginary parts of the source symbols at input of the modulator.

More particularly, N first modulating symbols, and N second modulating symbols respectively, are obtained from a linear combination of the real part, and imaginary part respectively, of a sequence of source symbols with the real part, and imaginary part respectively, of the same sequence of source symbols but offset with a delay R, with R being a non-zero integer. A frequency-time transformation, for example an inverse Fourier transform sized N is then applied separately to the N first modulating symbols and to the N second modulating symbols to deliver a first block and a second block of N carriers. The first and second blocks of N carriers are then summed in order to deliver a multicarrier symbol according to the invention.

It can be seen that the linear combination of the real part, and the imaginary part respectively, of a source symbol indexed k of the sequence with another source symbol indexed k+/−R of the sequence implements, in the frequency domain, i.e. before frequency-time transformation, a processing operation corresponding to a sine windowing in the time domain. Such a linear combination is implemented for at least certain source symbols of the sequence, for example N source symbols of the sequence. This means that the spectrum of a multicarrier symbol obtained is improved via the apodization of the multicarrier time signal thus generated.

Figure 1:
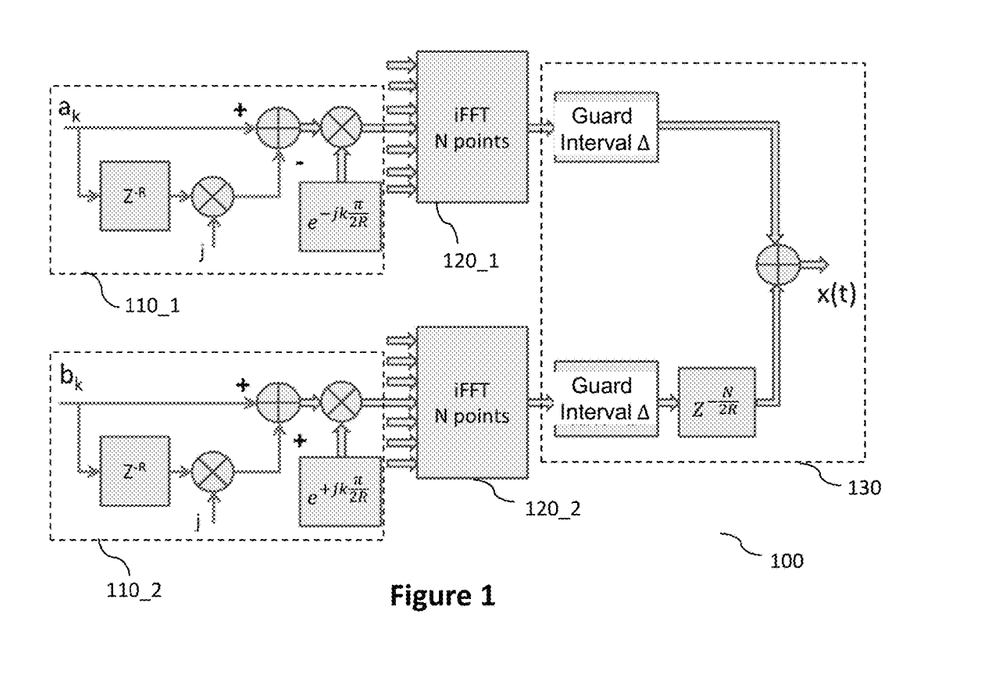
FIG. 1 illustrates the functional blocks of a device for generating a multicarrier signal according to one embodiment of the invention.

Referring now to FIG. 1, we describe the functional blocks of a device for generating a multicarrier signal according to one embodiment of the invention implementing the insertion of a guard interval. It can be noted that the insertion of a guard interval is optional according to the invention.

More particularly, the multicarrier signal comprises multicarrier symbols each comprising N carriers modulated by symbols obtained from source symbols belonging to a constellation of symbols, a source symbol having a frequency index k being expressed as $x_{(k)}=a_{(k)}+jb_{(k)}$. It is understood that in variants, some of the source symbols are set at zero so as to extinguish the corresponding sub-carriers. This is especially the case for addressing certain standards (e.g. LTE) in which the sub-carriers at the edge of the multicarrier symbol (i.e. for sub-carriers of minimum and maximum frequency indices) are extinguished so as to enable the coexistence of different multicarrier signals on adjacent frequency channels.

To generate such a signal, the generating device 100 comprises first of all two blocks for obtaining N modulating symbols from the sequence of source symbols:

a first block 110_1 for obtaining N first $c_{(k)}^1$ modulating symbols from the real part of the sequence of source symbols; and a second block 110_2 for obtaining N second $c_{(k)}^2$ modulating symbols from the imaginary part of the sequence of source symbols.

To this end, the first 110_1 and second 110_2 obtaining blocks implement for example the obtaining step E200 of the method for generating a multicarrier signal described here below with reference to FIG. 2.

The generating device 100 furthermore comprises, according to this example, two inverse Fourier transform blocks. These are a first block 120_1 applied to the N first modulating symbols $c_{(k)}^1$ obtained from the real part of the sequence of source symbols, and a second block 120_2 applied to the N second modulating symbols $c_{(k)}^2$ obtained from the imaginary part of the sequence of source symbols.

For example, the inverse Fourier transform blocks implement the inverse Fourier transform step E210 of the method for generating a multicarrier signal described here below with reference to FIG. 2.

The generating device 100 finally comprises a block 130 for generating a multicarrier symbol of the multicarrier signal from the first and second blocks of N carriers delivered respectively by the first 120_1 and second 120_2 inverse Fourier transform blocks.

To this end, the generating block 130 implements for example the generation step E220 of the method for generating a multicarrier signal described here below with reference to FIG. 2.

The above-mentioned different blocks of the generating device 100 can be implemented equally well on a reprogrammable computing machine (a PC computer, a DSP processor, a microcontroller, etc.) executing a program comprising a sequence of instructions or on a dedicated computing machine (for example a set of logic gates such as an FPGA, or an ASIC, or any other hardware module) in order to implement the method of generation of a multicarrier signal described here below with reference to FIG. 2.

Should the generation device 100 be made with a reprogrammable computing machine, the corresponding program (i.e. the sequence of instructions) could be stored in a storage medium that is detachable (for example a floppy disk, a CD ROM or a DVD ROM) or not detachable (for example a memory that may or may not be volatile), this storage medium being partially or totally readable by a computer or a processor. At initialization, the code instructions of the computer program are for example loaded into a random-access memory and then executed by a processor of the processing unit.

Figure 2:
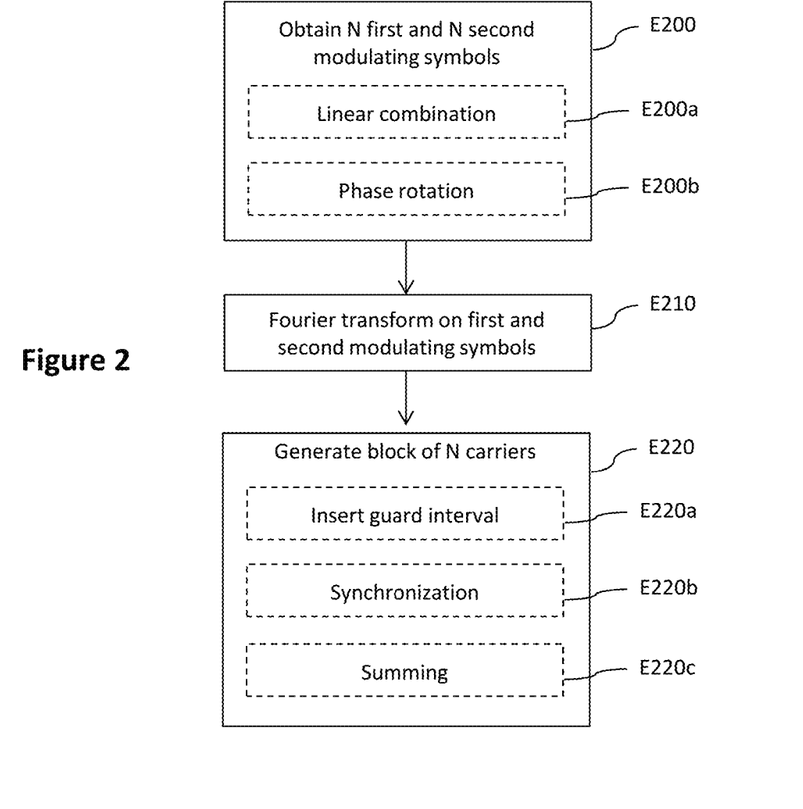
FIG. 2 illustrates the steps of a method for generating a multicarrier signal according to one embodiment of the invention.

Referring now to FIG. 2, we describe the steps of a method for generating a multicarrier signal according to one embodiment of the invention.

More particularly, the following steps are described for the generation of a multicarrier symbol of the multicarrier signal.

At a step E200, N first $c_{(k)}^1$ and N second $c_{(k)}^2$ modulating symbols are obtained from the sequence of source symbols, for example at output from the first obtaining block 110_1 and the second obtaining block 110_2 of the generation device 100.

To this end, at a sub-step E200a, the first obtaining block 110_1 carries out a linear combination between the real part of the symbols of the sequence of source symbols and the real part of the symbols of the same sequence but offset by a delay R. For example, the value of the delay R is a power of 2. According to the example illustrated in FIG. 1, the first block 110_1 for obtaining carries out a subtraction between the real part $a_{(k)}$ of a source symbol $x_{(k)}$ having a frequency index k, k being an integer ranging from R to N+R, and the real part $a_{(k-R)}$ of a source symbol $x_{(k-R)}$ having a frequency index k−R. Such a subtraction repeated for each index k comprised between R and N+R for example delivers N first combined symbols.

In one variant, the subtraction is implemented between the real part $a_{(k)}$ of a source symbol $x_{(k)}$ having a frequency index k, k being an integer ranging from 1 to N, and the real part $a_{(k+R)}$ of a source symbol $x_{(k+R)}$ having a frequency index k+R. Such a subtraction, repeated for each index k ranging from 1 to N, then delivers the N first combined symbols.

It can be seen that such a linear combination between the real parts of the symbols, performed in the frequency domain, i.e. before inverse Fourier transform, implements a sine windowing in the time domain, N/R representing a half-period (in number of samples) of the considered sine wave.

Indeed, the inverse Fourier transform of a sine function at the frequency f0 is proportional to $(\delta(f-f_0)-\delta(f+f_0))$. Thus, a convolution of the real part of the source symbols by the distribution $(\delta(f-f_0)-\delta(f+f_0))$ makes it possible to obtain a weighting of the time signal, i.e. after inverse Fourier transform, by such sine function.

The generated signal is then apodized and its spectrum is improved.

Besides, such a convolution of the real part $a_{(k)}$ of the source symbols $x_{(k)}$ leads to a simple and efficient implementation of the desired weighting in the form of a linear combination having the above-mentioned form, i.e.: $a_{(k)} - a_{(k-R)}$.

However, in order to minimize the propagation of the errors from estimated symbol to estimated symbol during the estimation of the source symbols at reception, the real part of the source symbol having a frequency index k–R, i.e. $a_{(k-R)}$, can be multiplied by the pure imaginary unit number, j, before being combined with (for example subtracted from) the real part of the source symbol having the frequency index k, i.e. $a_{(k)}$, so that the real parts $a_{(k)}$ and $a_{(k-R)}$ are phase-shifted by π/2. For example, the real part $a_{(k-R)}$ is phase-shifted in applying to it a phase rotation term equal to π/2. We thus obtain the first combined symbol having a frequency index k.

Besides, at a sub-step E200b, the first N modulating symbols, and second N modulating symbols respectively, are determined from at least one first combined symbol, and second combined symbol respectively. For example, the first combined symbol having a frequency index k is phase shifted in applying to it a phase rotation term, herein equal to –kπ/2R, in order to deliver the first modulating symbol having a frequency index $k, c_{(k)}^1$.

This means that the implementing of the step E200 by the first obtaining block 110_1 implements the operation:

$$c_{(k)}^1 = (a_{(k)} - ja_{(k-R)})e^{-j2k\frac{\pi}{4R}} \quad \text{(Eq-1)}$$

Similarly, the second obtaining block 110_2 carries out the same types of operations on the imaginary parts $b_{(k)}$ of the source symbols $x_{(k)}$ in order to deliver N second modulating symbols $c_{(k)}^2$. However, the implementing of the step E200 by the second obtaining block 110_2 more particularly implements the operation:

$$c_{(k)}^2 = (b_{(k)} + jb_{(k-R)})e^{+j2k\frac{\pi}{4R}} \quad \text{(Eq-2)}$$

Indeed, the Fourier transform envelope of the function $$A_{(k)} = (\delta_{(k)} - j\delta_{(k-R)})e^{-jk\frac{\pi}{2R}}$$

corresponds to a normalized frequency sine function $$f_0 = \frac{R}{2}$$

as is the case for the function $$B_{(k)} = (\delta_{(k)} + j\delta_{(k-R)})e^{+jk\frac{\pi}{2R}}.$$

Besides, R is the number of sine half-periods present on the time duration of a multicarrier symbol with N carriers. As a result, both the start and the end of the current multicarrier symbol are attenuated by zeros of the sine function, thereby improving the spectrum of the multicarrier signal thus generated.

At an inverse Fourier transform step E210, the first inverse Fourier transform block 120_1 of the generating device 100 applies an inverse Fourier transform to the N first modulating symbols $c_{(k)}^1$ in order to deliver a first block of N carriers. Similarly, the second block 120_2 applies an inverse Fourier transform to the N second modulating symbols 4) in order to deliver a second block of N carriers.

Finally, at step E220, the generation block 130 of the generation device 100 generates a multicarrier symbol of the multicarrier signal from the first and second blocks of N carriers delivered respectively by the first inverse Fourier transform block 120_1 and second inverse Fourier transform block 120_2 during the implementing of the step E210. For example, according to one embodiment illustrated in FIG. 1, at a sub-step E220a, a guard interval is inserted. To this end, the generation block 130 cyclically duplicates p*(N/R) samples of the first block of N carriers in order to deliver a first extended block of N carriers. Similarly, the generation block 130 cyclically duplicates p*(N/R) samples of the second block of N carriers in order to deliver a second extended block of N carriers.

Thus when N is a multiple of R, the duration of the guard interval is an integer multiple of a half-period of the sine weighting function. Thus, the start and end of the first and second extended blocks of N carriers remain attenuated by zeros of the sine function. The spectrum of the multicarrier signal obtained thus remains improved even when guard intervals are provided in the multicarrier symbols.

Besides, at a sub-step E220b, which is optional, the block 130 carries out a synchronization of the first and second extended blocks of N carriers. For example, the second extended block of N carriers is delayed by N/2R samples, i.e. by a quarter sine period relative to the first extended block of N carriers. First and second synchronized blocks of N carriers are thus delivered.

Thus, the sine functions weighting the first and second synchronized blocks are set in quadrature. This means that the real and imaginary parts of the source symbols can be easily differentiated and estimated at reception. Besides, the mean power of the temporal multicarrier signal thus generated is not degraded by the sine windowing, i.e. it remains appreciably constant over the duration of a multicarrier symbol.

In variants, the delay applied to the second extended block of N carriers is different from N/2R samples.

Finally, at a sub-step E220c, the block 130 carries out a summing of the first and second blocks of N synchronized carriers in order to generate the multicarrier symbol.

Figure 3A:
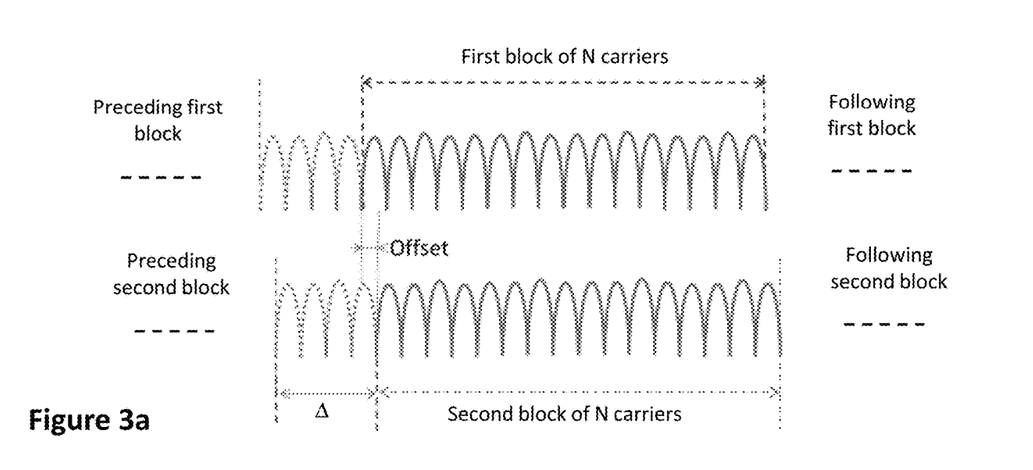
FIGS. 3a and 3b illustrate temporal and frequency waveforms generated during the implementing of the method of FIG. 2.
Figure 3B:
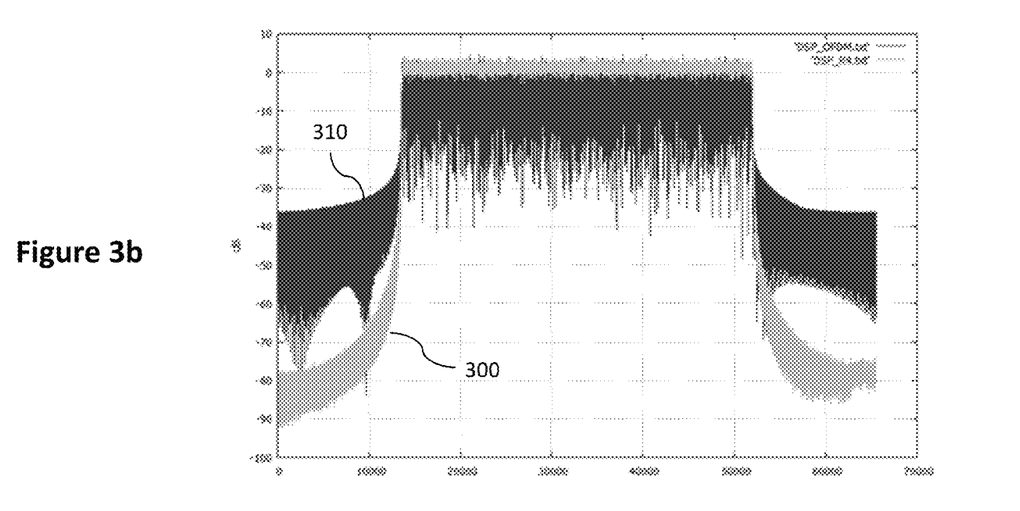

Referring now to FIGS. 3a and 3b, we describe time and frequency waveforms generated during the implementation of the method of FIG. 2.

More particularly, FIG. 3a illustrates a temporal view of the first and second blocks of N carriers as obtained before summing.

In the present example, the factor R is equal to 16. This means that 16 half-periods of sine values are present in the duration of the considered first and second blocks. Zeros of the sine weighting function thus attenuate both the start and the end of the first and second blocks of N carriers.

Besides, since the first and second blocks of N carriers are offset in time relative to each other by a time lag equal to N/2R, i.e. a quarter of a sine period, following the application of the sub-step E220b, the sine functions weighting respectively the first and second blocks of N carriers are in quadrature. Thus the real and imaginary parts of the source symbols can be easily differentiated and estimated in reception. Besides, the mean power of the multicarrier signal thus generated is not degraded by the considered sine windowing.

For example, as illustrated in FIG. 3a, the guard interval, A extends over a duration equal to four half-periods of the sine weighting function. In other words, the guard interval Δ is composed of 4*(N/R) samples cyclically duplicated from the first and second blocks of N carriers respectively. Thus the spectrum 300 (FIG. 3b) of the multicarrier symbol obtained after summing of the first and second blocks remains improved relative to the spectrum 310 of an OFDM signal comprising a same number of carriers. This remains true even when guard intervals are provided in the current multicarrier symbol and in the preceding or following multicarrier symbols.

It can be noted that the length of the interval is not necessarily equal to four half-periods of the sine weighting function. In particular, the length of the guard interval can be configured as a function of the dispersion of the channel, i.e. the length of the echoes.

Figure 4A:
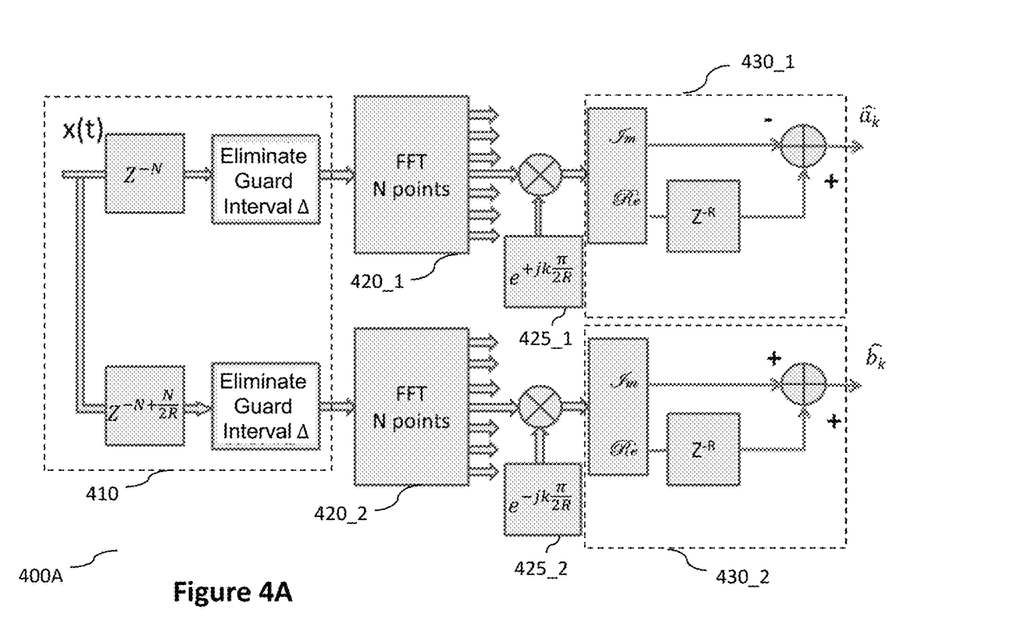
FIG. 4A illustrates the functional blocks of a device for demodulating a multicarrier signal according to one embodiment of the invention.
Figure 4B:
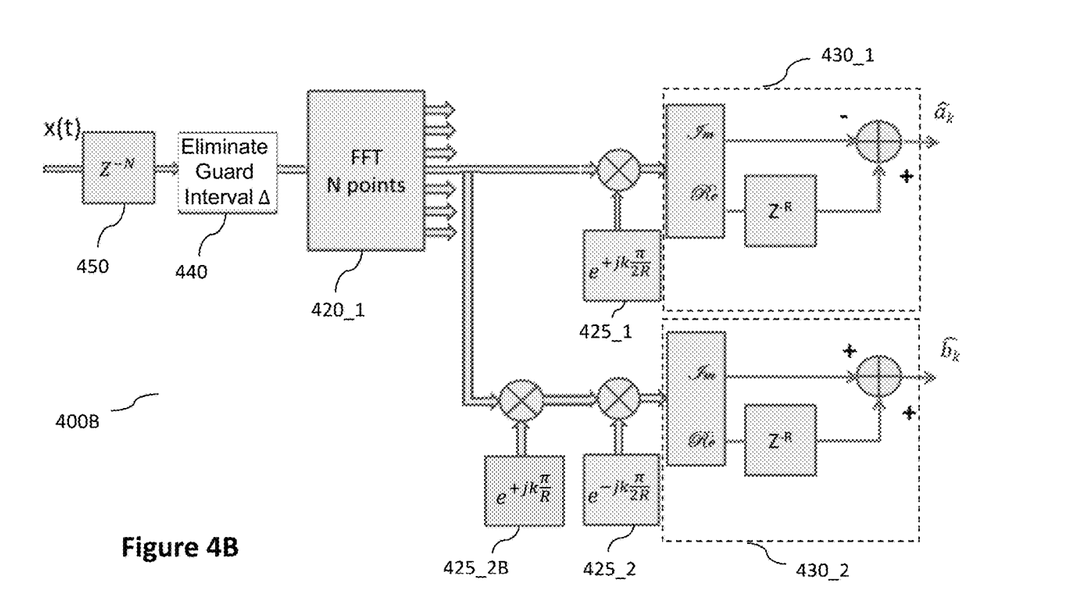
FIG. 4B illustrates the functional blocks of a device for demodulating a multicarrier signal according to another embodiment of the invention.
Figure 4C:
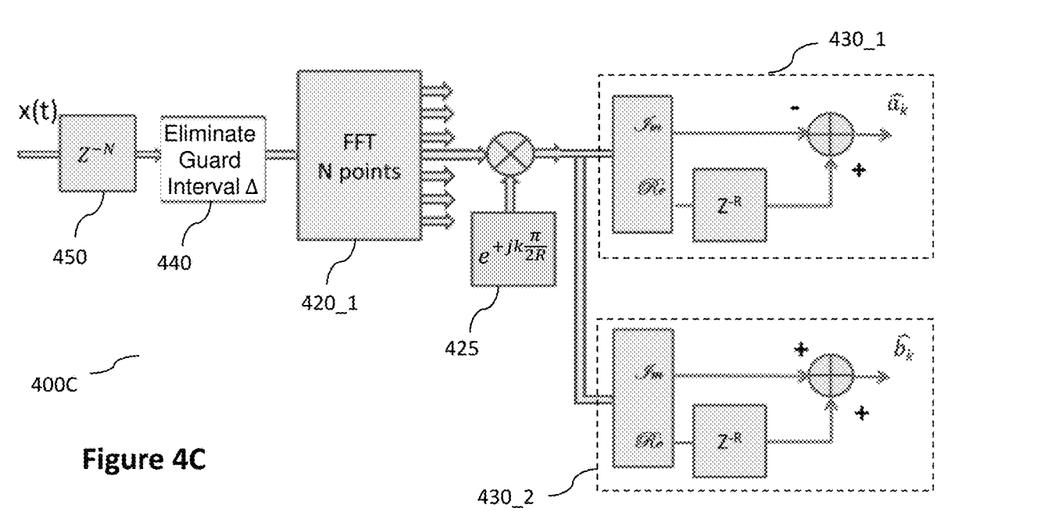
FIG. 4C illustrates the functional blocks of a device for demodulating a multicarrier signal according to yet another embodiment of the invention.

Referring now to FIGS. 4A to 4C, we describe the functional blocks of a device for demodulating a multicarrier signal generated according to the method of generation described here above with reference to FIG. 2, according to different embodiments.

The first device, illustrated in FIG. 4A, is adapted to demodulating a multicarrier signal transmitted with or without guard interval.

The demodulation device 400A comprises first of all a block 410 for obtaining a set of N first samples and a set of N second samples from N+p*(N/R) input samples of the considered multicarrier signal.

To this end, the obtaining block 410 implements for example the obtaining step E500 of the method of demodulation of a multicarrier signal described here below with reference to FIG. 5.

The generation device 400A also comprises two Fourier transform blocks, including a first block 420_1 applied to the N first samples, delivering N first modulating symbols and a second block 420_2 applied to the N second samples, delivering N second modulating symbols.

For example, the Fourier transform blocks implement the Fourier transform step E510 of the method for demodulating a multicarrier signal described here below with reference to FIG. 5.

The demodulation device 400A also comprises two phase rotation blocks, including a first block 425_1 applying a first phase shift to the N first modulating symbols, delivering N first phase-shifted modulating symbols and a second block 425_2 applying a second phase shift to the N second modulating symbols, delivering N second phase-shifted modulating symbols.

For example the first and second phase rotation blocks implement the step E520 of phase rotation of the method of demodulation of a multicarrier signal described here below with reference to FIG. 5.

The demodulation device 400A finally comprises two estimation blocks for estimating N source symbols conveyed by the multicarrier signal considered, including a first block 430_1 for estimating N source symbols from the N first phase-shifted modulating symbols and a second block 430_2 for estimating N source symbols from the N second phase-shifted modulating symbols.

For example, the first estimation block 430_1 and second estimation block 430_2 implement the estimation step E530 of the method for demodulating a multicarrier signal described here below with reference to FIG. 5.

Referring now to FIGS. 4B and 4C, we describe the functional blocks, according to other embodiments of the invention, of a demodulation device for demodulating a multicarrier signal generated according to the method of generation described here above with reference to FIG. 2.

More particularly, the demodulation devices 400B and 400C are adapted to the demodulation of a multicarrier signal, the multicarrier symbols of which comprise a guard interval. In other words, the multicarrier signal considered is generated when the method of generation of FIG. 2 implements the sub-step E220a for insertion of a guard interval.

The demodulation devices 400B and 400C, illustrated in FIGS. 4B and 4C, implement a single Fourier transform block 420_1, applied to a set of N input samples obtained from the multicarrier signal and delivering N modulating symbols.

Figure 5:
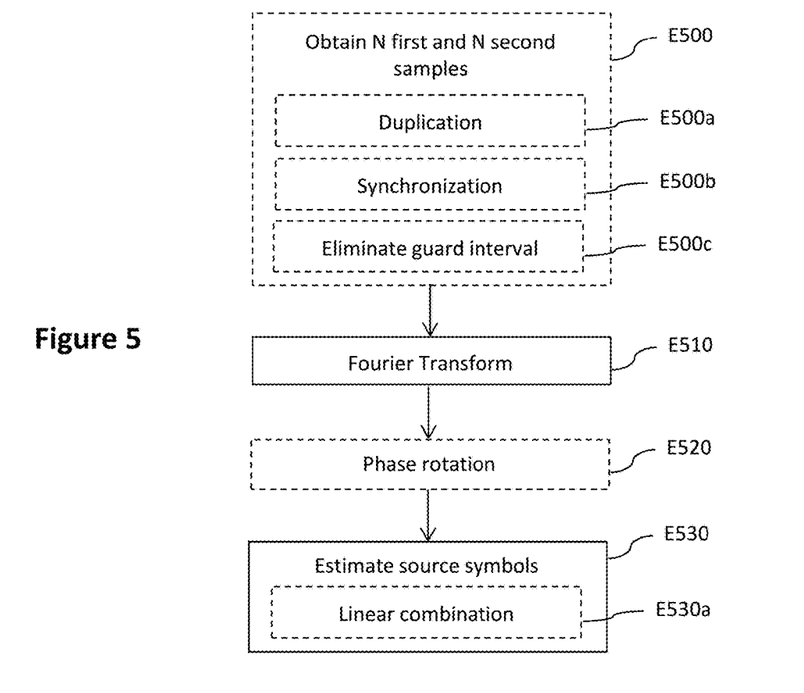
FIG. 5 illustrates the steps of a method for demodulating a multicarrier signal according to one embodiment of the invention.

For example, such a Fourier transform block 420_1 implements the step E510 of the demodulation method of FIG. 5.

More particularly, in the embodiment illustrated in FIG. 4B, we duplicate the N modulating symbols obtained at output of the Fourier transform block 420_1 delivering N first modulating symbols and N second modulating symbols.

The demodulating device 400B comprises also two phase-shifted rotation blocks, of which the first block 425_1 applying a first phase shift to the N first modulating symbols, delivering N first phase-shifted modulating symbols and the second block 425_2 applying a second phase shift to the N second modulating symbols, delivering N second phase-shifted modulating symbols.

An additional phase shift is implemented in an additional phase rotation block 425_2B, making it possible to differentiate the symbols processed by the first estimation block 430_1 and the second estimation block 430_2 from the symbols carried by the multicarrier signal.

In order to simplify the demodulator, in the embodiment illustrated in FIG. 4C, the N modulating symbols delivered by the Fourier transform block 420_1 are first of all phase shifted by a single phase rotation block 425 and then duplicated to supply the first symbols estimation block 430_1 and second symbols estimation block 430_2 implementing the estimation step E530 of the method for demodulating a multicarrier signal described here below with reference to FIG. 5.

As compared with the device 400A, the devices 400B and 400C do not comprise any block 410 for obtaining a set of N first samples and a set of N second samples as such. On the contrary, the set of N input samples given to the Fourier transform block 420_1 is obtained from a set of at least N samples of the multicarrier signal via a block 440 for eliminating the guard interval, as well as via a time-shift block 450, as the case may be, when this is needed in terms of hardware implementation.

The different above-mentioned blocks of the demodulation devices 400A, 400B and 400C can be implemented equally well on a reprogrammable computing machine (a PC computer, a DSP processor, a microcontroller, etc.) executing a program comprising a sequence of instructions, or a dedicated computing machine (for example a set of logic gates such as an FPGA or an ASIC, or any other hardware module) in order to implement the method of demodulation of a multicarrier signal described here below with reference to FIG. 5.

Should the demodulation devices 400A, 400B et 400C be made with a reprogrammable computing machine, the corresponding program (i.e. the sequence of instructions) could be stored in a storage medium that is detachable (for example a floppy disk, a CD ROM or a DVD ROM) or not detachable (for example a memory that may or may not be volatile), this storage medium being partially or totally readable by a computer or a processor. At initialization, the code instructions of the computer program are for example loaded into a random-access memory and then executed by a processor of the processing unit.

Referring now to FIG. 5, we describe the steps of a method of demodulation of a multicarrier signal according to one embodiment of the invention.

Such a method implements the operations symmetrical with those of the method for generating a multicarrier signal described here above with reference to FIG. 2.

If, by way of an example, we consider the demodulation device illustrated in FIG. 4A, at a step E500, the block 410 of the demodulation device 400 obtains a set of N first samples and a set of N second samples from the N+p*(N/R) input samples of the considered multicarrier signal.

More particularly, at a sub-step E500a, the block 410 duplicates the N+p*(N/R) input samples of the multicarrier signal in order to deliver a set of N+p*(N/R) first input samples and a set of N+p*(N/R) second input samples.

At a sub-step E500b, the obtaining block 410 synchronizes the sets of N+p*(N/R) first input samples and N+p*(N/R) second input samples in order to deliver a set of N+p*(N/R) first synchronized samples and a set of N+p*(N/R) second synchronized samples. For example, the set of N+p*(N/R) first samples is delayed by N/2R samples relative to the set of N+p*(N/R) second samples. Thus, the sine functions weighting the first and second synchronized blocks generated by the generation block 130 described here above with reference to FIG. 1 are put back into phase.

Finally, during a sub-step E500c, the block 410 eliminates the guard interval Δ by eliminating p*(N/R) samples among the N+p*(N/R) synchronized first samples, and among the N+p*(N/R) synchronized second samples respectively, delivering the considered set of N first samples, and the set of N second samples respectively.

At a step E510, the first block 420_1 of the demodulation device 400 applies a Fourier transform, in this case a direct transform, to the N first samples in order to deliver N first modulating symbols. Similarly, the second block 420_2 of the demodulation device 400 applies a Fourier transform, also a direct transform, to the N second samples in order to deliver N second modulating symbols.

At a step E520, the first phase rotation block 425_1 adds a phase rotation term, in this case equal to $+k\pi/2R$, to the first modulating symbols in order to deliver N first phase-shifted modulating symbols. Such an operation makes it possible to cancel the phase rotation term added during the generation of the multicarrier signal as described here above with reference to FIG. 2.

Similarly, the second phase rotation block 425_2 adds a phase rotation term, in this case equal to $-k\pi/2R$, to the second modulating symbols in order to deliver N second phase-shifted modulating symbols.

At a step E530, N source symbols conveyed by the multicarrier signal considered are estimated from the N first and N second modulating symbols.

More particularly, at a sub-step E530a, the first estimation block 430_1 carries out a linear combination, for example a subtraction, between the imaginary part of a first phase-shifted modulating symbol having a frequency index k and the real part of a first phase-shifted modulating symbol having a frequency index k−R. The considered linear combination delivers an estimate $\hat{a}_{(k)}$ of the real part of one of the N considered source symbols.

Indeed, referring to the analytical expression of the first modulating symbol having a frequency index k given by the equation (Eq-1) here above, the expression of an estimate of the first phase-shifted modulating symbol indexed k, $$\hat{c}^1_{(k)} e^{+j2k\frac{\pi}{4R}},$$

is therefore given by:

$$\hat{c}^1_{(k)} e^{+j2k\frac{\pi}{4R}} = (\hat{a}_{(k)} - j\hat{a}_{(k-R)}) \quad \text{(Eq-3)}$$

It can thus be seen that:

$$\Re\left(\hat{c}^1_{(k-R)} e^{+j2(k-R)\frac{\pi}{4R}}\right) - \Im\left(\hat{c}^1_{(k)} e^{+j2k\frac{\pi}{4R}}\right) = 2\hat{a}_{(k-R)}$$

In one variant, the subtraction is done between the imaginary part of a first phase-shifted modulating symbol having a frequency index k and the real part of another first phase-shifted modulating symbol having a frequency index k+R.

Similarly, the second estimation block 430_2 carries out the same operations as the block 430_1 but on the second modulating symbols in order to deliver an estimate $\hat{b}_{(k)}$ of the imaginary part of the considered N source symbols. However, according to the embodiment illustrated, the linear combination implemented in the second estimation block 430_2 corresponds here to an addition.

Indeed, referring to the analytical expression of the second modulating symbol having a frequency index k given by the equation (Eq-2) above, the expression of an estimate of the second phase-shifted modulating symbol having a frequency index k, $$\hat{c}^2_{(k)} e^{-j2k\frac{\pi}{4R}},$$

is given by:

$$\hat{c}^2_{(k)} e^{-j2k\frac{\pi}{4R}} = (\hat{b}_{(k)} + j\hat{b}_{(k-R)}) \quad \text{(Eq-4)}$$

It can be seen that:

$$\Re\left(\hat{c}^2_{(k-R)} e^{-j2(k-R)\frac{\pi}{4R}}\right) + \Im\left(\hat{c}^2_{(k)} e^{-j2k\frac{\pi}{4R}}\right) = 2\hat{b}_{(k-R)}$$

In some specific embodiments corresponding to an implementation either according to FIG. 4B or according to FIG. 4C of the demodulation device 400B or 400C implementing the method of demodulation, the obtaining step E500 is not implemented. This is especially possible when the multicarrier symbols of the multicarrier signal comprise a guard interval.

Indeed, the guard interval Δ:
on the one hand corresponds to a cyclical duplication of the first and second synchronized blocks generated during the implementation of the step E220b of the method of generation by the block 130, of which the multicarrier symbols are composed; and on the other hand corresponds to a duration greater than or equal to the time shift corresponding to the setting in quadrature of the sine weighting functions of the first and second current blocks.

It can be seen that the direct Fourier transform window can be placed on the same samples of a multicarrier symbol in order to obtain N modulating symbols containing all the information of the N first and N second modulating symbols obtained during the implementing of the step E200 of the method of generation by the blocks 110_1 and 110_2.

In this case, the effect of the time shift can be compensated for in the frequency domain.

In the embodiment corresponding to an implementation according to FIG. 4B of the demodulation device 400B, such a compensation is for example made by an additional phase rotation by +Kπ/R, applied during the step E520 by the additional phase rotation block 425_2B described here above with reference to FIG. 4B.

In the embodiment corresponding to an implementation of the demodulation device 400C according to FIG. 4C, such a compensation is for example done in a common phase rotation by +kπ/2R applied during the step E520 by the single phase rotation block 425 described here above with reference to FIG. 4C. Besides, in this embodiment, the method implements a step of duplication of the N phase-shifted modulating symbols delivering N first phase-shifted modulating symbols, and N second phase-shifted modulating symbols respectively. As a result, the sub-step of linear combination E530a is applied to the N first phase-shifted modulating symbols, and N second phase-shifted modulating symbols respectively, so as to deliver an estimate $\hat{a}_{(k)}$ of the real part, and an estimate $\hat{b}_{(k)}$ of the imaginary part respectively, of one of the source symbols carried by the demodulated multicarrier signal.

In these embodiments, the demodulating devices 400B and 400C apply, during the step E510, a single Fourier transform, in this case a direct Fourier transform, to N input samples obtained from the multicarrier signal in order to deliver the N modulating symbols. More particularly, according to the discussed embodiments, the set of N input samples given to the Fourier transform block 420_1 is obtained by implementing:

a step for the temporal offset of a set of N+p*(N/R) input samples delivering a set of N+p*(N/R) synchronized samples; and a step for eliminating the guard interval Δ by eliminating the p*(N/R) samples among the N+p*(N/R) samples of the set of N+p*(N/R) synchronized samples.

In other non-illustrated embodiments, the sub-step E220a for inserting a guard interval is not implemented by the generation device 100. In this case, the block 130, in the sub-step E220b, carries out the synchronization of the first and second blocks of N carriers (delivered respectively by the blocks 120_1 and 120_2) instead of the synchronization of the first and second blocks of N extended carriers. The multicarrier symbol is then generated (for example by summing) from the first and second synchronized blocks thus obtained from the first and second blocks of N carriers. Symmetrically, the demodulation device 400A then does not implement the sub-step E500c for eliminating the guard interval.

In yet other embodiments not shown, the generation device 100 does not implement the synchronization sub-step E220b. In this case, the block 130 generates a multicarrier symbol (for example by summing) directly from the first and second blocks of N carriers (extended or not extended depending on whether or not the embodiment considered implements the sub-step E220a for inserting a guard interval). Symmetrically, the demodulation device 400A then does not implement the sub-step E500b for synchronizing the sets of first and second input samples.

The invention claimed is:

1. A method for generating a multicarrier signal formed by multicarrier symbols, wherein the method comprises the following acts performed by a device for generating at least one of said multicarrier symbols:

obtaining N first modulating symbols and N second modulating symbols from a sequence of source symbols, N being a positive integer, said obtaining comprising, for at least one of said source symbols indexed k:

performing a linear combination of a real part, and an imaginary part respectively, of said source symbol indexed k with a real part, and an imaginary part respectively, of one of said source symbols indexed k+/−R, with k being a positive integer and R being a positive integer, said linear combination delivering at least one first combined symbol, and at least one second combined symbol respectively, at least one of said N first modulating symbols, and at least one of said N second modulating symbols respectively, being a function of said at least one first combined symbol, and said at least one second combined symbol respectively;

performing a frequency-time transformation, of said N first modulating symbols, delivering a first block of N carriers, each carrier of said first block being modulated by one of said first modulating symbols, and of said N second modulating symbols, delivering a second block of N carriers, each carrier of said second block being modulated by one of said second modulating symbols; and generating said multicarrier symbol from said first and second blocks of N carriers.

2. The method according to claim 1, wherein said obtaining further comprises a phase rotation applied to said at least one first combined symbol, and to said at least one second combined symbol respectively, delivering said at least one of said N first modulating symbols, and said at least one of said N second modulating symbols respectively.

3. The method according to claim 1, wherein:

said generating comprises synchronization of said first and second blocks of N carriers delivering first and second synchronized blocks, said multicarrier symbol being generated from said first and second synchronized blocks.

4. The method according to claim 3, wherein said generating comprises summing said first and second synchronized blocks, delivering said multicarrier symbol.

5. The method according to claim 3, wherein said generating further comprises insertion of a guard interval, by cyclical duplication of p*(N/R) samples of said first block of N carriers, and second block of N carriers respectively, with p being a positive integer and R being an integer sub-multiple of N, delivering first extended blocks of N carriers, and second extended blocks of N carriers respectively, said synchronization being applied to said first and second extended blocks to deliver the first and second synchronized blocks.

6. The method of generation according to claim 1, wherein said linear combination comprises a summing or a subtraction between said real part, and said imaginary part respectively, of said source symbol indexed k and said real part, and said imaginary part respectively, of the source symbol indexed k+/−R multiplied by a pure imaginary number.

7. The method according to claim 1, further comprising: transmitting the multicarrier signal on a network.

8. A non-transitory computer-readable medium comprising program code instructions stored thereon for the implementing of a method of generating a multicarrier signal formed by multicarrier symbols, when said program code instructions are executed by a processor of a modulating device, wherein the program code instructions configure the modulating device to:
obtain N first modulating symbols and N second modulating symbols from a sequence of source symbols, N being a positive integer, said obtaining comprising, for at least one of said source symbols indexed k;
performing a linear combination of a real part, and an imaginary part respectively, of said source symbol indexed k with a real part, and an imaginary part respectively, of one of said source symbols indexed k+/−R, with K being a positive integer and R being a positive integer,
said linear combination delivering at least one first combined symbol, and
at least one second combined symbol respectively,
at least one of said N first modulating symbols, and at least one of said N second modulating symbols respectively, being a function of said at least one first combined symbol, and said at least one second combined symbol respectively;
perform a frequency-time transformation, of said N first modulating symbols, delivering a first block of N carriers, each carrier of said first block being modulated by one of said first modulating symbols, and of said N second modulating symbols, delivering a second block of N carriers, each carrier of said second block being modulated by one of said second modulating symbols; and
generate said multicarrier symbol from said first and second blocks of N carriers.

9. A device for generating a multicarrier signal formed by multicarrier symbols, wherein the device comprises:
a processor; and
a non-transitory computer-readable medium comprising program code instructions stored thereon which when executed by the processor configure the device to generate at least one of said multicarrier symbols by:
obtaining N first modulating symbols and N second modulating symbols from a sequence of source symbols, N being a positive integer, said obtaining comprising, for at least one of said source symbols indexed k:
performing a linear combination of a real part, and an imaginary part respectively, of said source symbol indexed k with a real part, and an imaginary part respectively, of one of said source symbols indexed k+/−R, with k being a positive integer and R being a positive integer,
said linear combination delivering at least one first combined symbol, and at least one second combined symbol respectively,
at least one of said N first modulating symbols, and at least one of said N second modulating symbols respectively, being a function of said at least one first combined symbols, and at least one second combined symbols respectively;
performing a frequency-time transformation of said N first modulating symbols, delivering a first block of N carriers, each carrier of said first block being modulated by one of said first modulating symbols, and of said N second modulating symbols, delivering a second block of N carriers, each carrier of said second block being modulated by one of said second modulating symbols; and
generating said multicarrier symbol from said first and second blocks of N carriers.

10. A method for demodulating a multicarrier signal formed by multicarrier symbols, wherein the method comprises the following acts performed by a demodulating device:
performing a time-frequency transformation of a set of N input samples obtained from said multicarrier signal, delivering at least N modulating symbols, N being a positive integer; and
estimating at least one source symbol from N first modulating symbols, and N second modulating symbols respectively, obtained from said at least N modulating symbols, said estimating comprising, for at least one of said N first modulating symbols indexed k, and N second modulating symbols indexed k respectively:
performing a linear combination of an imaginary part of said modulating symbol indexed k, with a real part of one of said N first modulating symbols indexed k+/−R, and N second modulating symbols indexed k+/−R respectively, with k being a positive integer and a R being a positive integer,
said linear combination delivering a real part, and an imaginary part respectively, of an estimate of said at least one source symbol.

11. The method according to claim 10, furthermore comprising:
obtaining a set of N first samples and a set of N second samples from at least N input samples of said multicarrier signal,
and wherein said time-frequency transformation is applied on the one hand to said set of N first samples delivering said N first modulating symbols, and on the other hand to said set of N second samples delivering said N second modulating symbols.

12. The method according to claim 11, wherein said obtaining comprises:
duplicating said at least N input samples of said multicarrier signal delivering a set of at least N first input samples and a set of at least N second input samples; and
synchronizing said sets of at least N first input samples and at least N second input samples delivering a set of at least N first synchronized samples and a set of at least N second synchronized samples;
said set of N first and N second samples being obtained from said sets of at least N first and N second synchronized samples.

13. The method according to claim 12, wherein:
said at least N first synchronized samples, and at least N second synchronized samples respectively, are N+p*(N/R) first synchronized samples, and N+p*(N/R) second synchronized samples respectively, with p being a positive integer and R being an integer sub-multiple of N, said obtaining comprising eliminating a guard interval by elimination of p*(N/R) samples among said N+p*(N/R) first synchronized samples, and among said N+p*(N/R) second synchronized samples respectively, delivering said set of N first samples, and said set of N second samples respectively.

14. The method according to claim 10, wherein:
said time-frequency transformation delivers said N first and N second modulating symbols, and
the method furthermore comprises a phase rotation applied to said N first modulating symbols, and N second modulating symbols respectively, delivering N first phase-shifted modulating symbols, and N second phase-shifted modulating symbols respectively,
said linear combination being applied to said N first phase-shifted modulating symbols, and N second phase-shifted modulating symbols respectively, to deliver said at least one source symbol.

15. The method according to claim 10, further comprising:
applying a phase rotation to said at least N modulating symbols delivering N phase-shifted modulating symbols; and
duplicating said N phase-shifted modulating symbols, delivering N first phase-shifted modulating symbols, and N second phase-shifted modulating symbols respectively;
said linear combination being applied to said N first phase-shifted modulating symbols, and to said N second phase-shifted modulating symbols, respectively, to deliver said at least one source symbol.

16. The method according to claim 10, further comprising:
receiving the multicarrier signal from a network.

17. A device for demodulating a multicarrier signal formed by multicarrier symbols, wherein the device comprises:
a processor; and
a non-transitory computer-readable medium comprising program code instructions stored thereon which when executed by the processor configure the device to:
perform a time-frequency transformation of a set of N input samples of said multicarrier signal, delivering at least N modulating symbols, N being a positive integer; and
estimate at least one source symbol from N first modulating symbols, and N second modulating symbols respectively, obtained from said at least N modulating symbols, said estimate comprising, for at least one of said N first modulating symbols, and at least one of said N second modulating symbols respectively, indexed k:
performing a linear combination of an imaginary part of said modulating symbol indexed k, with a real part of one of said N first modulating symbols, and one of said N second modulating symbols respectively, indexed k+/−R, with k being a positive integer and R being a positive integer,
said linear combination delivering a real part, and an imaginary part respectively, of an estimate of said at least one source symbol.

* * * * *